(12) United States Patent
Garoff et al.

(10) Patent No.: US 7,432,220 B2
(45) Date of Patent: Oct. 7, 2008

(54) METHOD FOR THE PREPARATION OF OLEFIN POLYMERIZATION CATALYST SUPPORT AND AN OLEFIN POLYMERIZATION CATALYST

(75) Inventors: Thomas Garoff, Helsinki (FI); Päivi Waldvogel, Porvoo (FI); Kari Pesonen, Monninkylä (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/536,523

(22) PCT Filed: Dec. 18, 2002

(86) PCT No.: PCT/EP02/14463

§ 371 (c)(1),
(2), (4) Date: Nov. 30, 2005

(87) PCT Pub. No.: WO2004/055068

PCT Pub. Date: Jul. 1, 2004

(65) Prior Publication Data

US 2006/0154805 A1 Jul. 13, 2006

(51) Int. Cl.
*B01J 25/00* (2006.01)
*B01J 37/00* (2006.01)
*C08F 4/02* (2006.01)
*C08F 4/60* (2006.01)

(52) U.S. Cl. .................. 502/103; 502/104; 502/113; 502/115; 502/117

(58) Field of Classification Search ................ 502/107, 502/111, 115, 125, 132–134, 154, 156, 169, 502/171; 526/124.2
See application file for complete search history.

(56) References Cited

U.S. PATENT DOCUMENTS

| | | |
|---|---|---|
| 4,277,372 A | 7/1981 | Matlack et al. |
| 4,496,660 A | 1/1985 | Gessell et al. |
| 4,652,541 A | 3/1987 | Imai et al. |

FOREIGN PATENT DOCUMENTS

| | | |
|---|---|---|
| EP | 0108489 | 5/1984 |
| EP | 0197166 | 10/1986 |
| EP | 0258089 | 3/1988 |
| EP | 0591922 | 4/1994 |
| WO | WO 99/55741 | 11/1999 |
| WO | WO 99/58584 | 11/1999 |
| WO | WO 01/55230 | 8/2001 |

OTHER PUBLICATIONS

A. Enders and G. Maas, "Die fluorige Phase: Organische Chemie mit hochfluorierten Reagenzien und Lösungsmitteln," Chemie in unserer Zeit, 34(6):382-393 (2000) [English Abstract].
International Search Report for PCT/EP02/14463 mailed Dec. 11, 2003.
Pierandrea Lo Nostro, "Phase separation properties of fluorocarbons, hydrocarbons and their copolymers," Advances in Colloid and Interface Science, 56:245-287 (1995).
Zhang Hanzhuo et al., "Catalysts for production of linear polyethylene by gas-phase fluidized bed process," CAPLUS (Abstract), AN 2003: 89705, PN 138:107/52.

*Primary Examiner*—Jerry Lorengo
*Assistant Examiner*—James E McDonough
(74) *Attorney, Agent, or Firm*—McDonnell, Boehnen, Hulbert & Berghoff LLP

(57) ABSTRACT

The invention is directed to a process for producing a particulate support for an olefin polymerisation catalyst wherein a solution of a magnesium compound is contacted with a solution of an element of Group (13 or 14) of the Periodic Table (IUPAC) to obtain a solid reaction product. In the process of the invention the solid reaction product is formed by: i) contacting (a) a solution of a magnesium hydrocarbyloxy compound with (b) a solution of a halogen-containing compound of an element of Group (13 or 14) of the Periodic Table (IUPAC); and ii) recovering the solidified reaction product from the reaction mixture.

47 Claims, No Drawings

US 7,432,220 B2

METHOD FOR THE PREPARATION OF OLEFIN POLYMERIZATION CATALYST SUPPORT AND AN OLEFIN POLYMERIZATION CATALYST

The present invention relates to a catalyst support, to a preparation process thereof, to a Ziegler-Natta catalyst, as well as to the use of the catalyst for polymerising olefins.

BACKGROUND ART

Ziegler-Natta (ZN) polyolefin catalysts are well known in the field of polymers. Generally, they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. ZN catalyst may also comprise (b) further catalyst component(s), such as a cocatalyst and/or an external donor.

Various methods have been developed for preparing ZN catalysts. In one method the catalyst components are impregnated on a particulate support material, such as silica, to obtain a solid ZN catalyst system. For example in WO 01 55230 of Borealis a solution of a chlorine-containing compound, e.g. ethylaluminium dichloride, and a magnesium hydrocarbyloxy compound is first prepared and the obtained solution is impregnated together with a transition metal compound into a porous support.

Solid ZN catalysts, wherein no external support, such as silica, is used, are also known in the field. U.S. Pat. No. 4 496 660 of Dow discloses a catalyst support formed by reacting in an inert diluent (A) the reaction product of (1) an organomagnesium component, (2) an oxygen- and/or nitrogen-containing compound, optionally dissolved or dispersed to a halide containing compound of a transition metal; and (B) a transition metal-free halide source. In the examples the compound (1) is combined with the compound (2) and a halogen-free aluminium compound and then a transition metal compound is added. The obtained solids are then reacted with the compound (B). EP 591 922 of Mitsui discloses a titanium catalyst prepared by contacting (A) a solution of a halogen-containing magnesium compound, an alcohol having at least 6 carbon atoms and a hydrocarbon solvent, with an organoaluminum compound to form a solid complex which is treated with (B) a tetravalent titanium compound.

WO 99 55741 of Fina describes a process for preparing a Ziegler-Natta catalyst by (i) mixing in a hydrocarbon solvent a dialkyl magnesium compound with a chlorinating agent to precipitate a magnesium dichloride derivative. The chlorinating agent is obtainable from the reaction between an alcohol ROH and an alkyl aluminium chloride. The precipitate is washed or reacted to remove unwanted reducing species and the obtained magnesium dichloride derivative is titanated. WO 99 58584 of Borealis describes a further method for preparing a ZN catalyst, wherein a Mg compound is first reacted with an alcohol and the obtained complex is added to a solution of chlorine containing aluminium compound to form a solid reaction product. The obtained slurry is used as such in the next step and to this slurry titanium tetrachloride is added. EP 197 166 of Dow-describes a catalyst solution, wherein (A) an organomagnesium compound, (B) an organic OH-containing compound, (C) a reducing halide source of Al or B and (D) a transition metal compound are added in the order (A), (B), (C) and (D); or (A), (B), (D) and (C), and the obtained reaction solution is used as such for the polymerisation. Again no washing steps between the additions are made and no separation of the final reaction product from the reaction media is effected.

Accordingly, although much development work has been done in the field of Ziegler-Natta catalysts, there remains a continuing search for alternative or improved methods of producing ZN catalysts with desirable properties, such as morphology.

SUMMARY OF THE INVENTION

The present invention provides a further process for preparing a solid catalyst support, and a ZN catalyst component based on said support, with an unexpected effect. A further solid catalyst support and a further ZN catalyst component with improved properties are also provided.

A further aspect of the invention is to provide an olefin polymerisation process using the ZN catalyst prepared according to the preparation process of the invention.

DESCRIPTION OF THE INVENTION

It has surprisingly been found that when a solid reaction product is formed from a magnesium hydrocarbyloxy compound and a halogen-containing compound of an element of Group 13 or 14 of the Periodic Table (IUPAC, Nomenclature of Inorganic Chemistry, 1989, used also below), and the obtained solid product is recovered from the reaction mixture, a solid catalyst precursor, herein referred as a catalyst support material, with i.a. markedly improved morphology can be obtained. The support material of the invention can then be treated with further catalytically active compound(s), such as with one or more transition metal compounds, to obtain a catalyst component for olefin polymerisation.

Due to the beneficial properties of the support material of the invention, the good morphology is maintained during the treatment step of the support with further catalytically active compounds, whereby also the resulting final catalyst component has an excellent morphology, such as a desirable particle size and a narrow particle size distribution (PSD).

Furthermore, the final catalyst of the invention exhibits high catalytic activity and the polymer product produced therewith has i.a. a decreased amount of fines (i.e. particles with size <100 µm), i.e. below 15%, preferably below 10% of fines. Even fines content below 6% can be obtained.

According to the method of the invention a particulate catalyst support to be used as a polymerisation catalyst component is prepared first by (a) contacting a solution of a magnesium hydrocarbyloxy compound (compound (1)) with (b) a solution of a halogen-containing compound of an element of Group 13 or 14 of the Periodic Table (IUPAC) (compound (2)) to obtain a solid particulate reaction product. Then the obtained reaction product is recovered from the reaction mixture by separating the solid product from the liquid reaction medium and/or by washing the product before it is used as a support material.

In a preferred embodiment of the invention the solution of the compound(s) (1) is added to the solution of compound(s) (2) to cause the solidification (precipitation) of the solid reaction product. A slowly addition under mixing is preferred. By slowly addition it is meant herein that the solution (1) is added gradually, e.g. dropwise or other similar means, to cause a uniform solidification reaction as known in the art. The solidification step may be effected suitably at the ambient temperature.

It has been found that in order to achieve the beneficial properties of the support material, the obtained solid reaction product should be recovered from the reaction mixture of solution (1) and (2) before the use as a support. The recovery step can be effected in various ways including the separation of the liquid reaction medium from the solid reaction product, e.g. by filtration, decantation or suction, and/or washing the solid product with a wash solution e.g. in a manner known in the art, before it is used as a support material. Thus the possible washing step can be carrier out after the solids are separated from the liquid medium or, alternatively, without any separation of the solids from the reaction mixture (or the liquid reaction medium is removed only partially), by adding the wash solution directly to the reaction mixture. The recovery step of the invention covers also the dilution of the reaction mixture and the use of the diluted support slurry in the next step for preparing the catalyst component.

It is evident for a skilled person that the washing efficiency can be varied within the scope of the invention depending on the desired washing effect and can be controlled e.g. by the number of the washing steps, the temperature, the solvent(s) used for washing, the amount of the wash solution and the washing time. The wash temperature can be e.g. 0-100° C., suitably 20-100° C., e.g. 40-80° C., such as 55-70° C. Thus the duration of a washing (e.g. the mixing time of the slurry in a wash solution) depends on the desired effect and can be chosen accordingly.

Further treatment steps of the solid reaction product may also be possible after the combination of solutions (1) and (2) before or during the recovery step of the invention. Such treatment includes e.g. a heating step of the reaction mixture after the solidification at an elevated temperature, e.g. up to 100° C., such as 40 to 80° C., suitably 50 to 75° C., for a suitable period of time, such as from 5 minutes to 24 hours, e.g. 10 to 120 minutes, such as 20 to 60 minutes, before the recovery step.

In a preferable embodiment, the molar ratio of the element of Group 13 or 14 of the Periodic Table to magnesium in the catalyst support material of the invention is at least 0.3 ($\geq$0.3). Preferably the molar ratio of said element of Group 13 or 14 of the Periodic Table to magnesium is at least 0.4 ($\geq$0.4), or preferably at least 0.5 ($\geq$0.5), or at least of 0.6 ($\geq$0.6). Said ratios result is catalyst with very good morphology and reduced amount of fines content of the produced polymer product. In a further embodiment of the invention said molar ratio may be even at least 0.7 ($\geq$0.7) or 0.80 ($\geq$0.80), such as 0.85 ($\geq$0.85), depending on the properties desired for the catalyst. In principle, the upper limit of said ratio range is not limited, but may be e.g. 1.1. In one preferred embodiment said upper limit of said molar ratio is 0.99. The above-said molar ratio can be determined in a known manner, e.g. using flame atomic absorption method with e.g. a nitrous oxide/acetylene flame.

Accordingly, the recovery step already improves i.a. the morphology of the catalyst and the produced polymer compared to the prior art practices, wherein the reaction product has not been recovered (i.e. the reaction mixture is used as such or the solids are separated from the reaction media and used without any washing step). And said preferable molar ratio of the support material can provide further advantages, such as a preferred morphology with e.g. desirable yields of the catalyst component.

It is generally known that the said molar ratio of the obtained catalyst support can depend on the used starting material, the used preparation method of the support material, reaction conditions and any treatment steps of the reaction product after the combination of the solutions (1) and (2), and can be chosen accordingly to achieve the desired ratio.

Preferably, the molar ratio of the element of compound (2) to magnesium in the support material is adjusted to a desired range by means of the recovery step of the invention, i.e. by separating the solids from the liquid reaction medium and/or by washing the solids as described above. Particularly, the obtained solid reaction product is washed with a wash solution, and the washing procedure can be repeated, if needed, until the desired ratio is obtained. The ratio can be monitored between the washings, if needed, e.g. by analysing the support samples in a conventional manner the relevant contents of the reaction product or the reaction medium, e.g. the mol-% of Mg and the mol-% of the element from Group 13 or 14 of the Periodic Table in the formed carrier material.

Suitably, a moderate washing is effected to achieve the molar ratio of the invention. Thus the washing treatment of the invention provides convenient means for adjusting the ratio of the support elements to the preferred level (generally, the more thorough washing the lower ratio is obtained).

The said molar ratio of the support material of the invention is believed to give a beneficial loading of the active species in the final catalyst component.

After the recovery step of the invention, the solid reaction product can be used as a support material for further catalytically active compounds, such as one or more transition metal compound(s) to form a final polymerisation catalyst component, such as the ZN catalyst component of the invention. The term "particulate/solid support material" means herein an intermediate, i.e. catalyst precursor, that is treated with further catalyst forming compounds as defined below to obtain the final catalyst component. Preferably, the solid support of the invention is first formed in the absence of the catalyst forming transition metal compound, and after the formation thereof treated with said transition metal compound.

Accordingly, in the method of the invention for preparing a Ziegler-Natta catalyst component, the catalyst support of the invention, preferably prepared according to the present method, is suspended in an organic solvent and treated at least with one transition metal compound. The treatment step is preferably effected in a manner known in the art.

Generally, in the final solid catalyst particles, the molar ratio of Mg:Ti can be e.g. between 10:1 to 1:10, preferably less than 5:1, such as between (less than 5:1) and 1:1. The molar ratio of Ti:Al can be e.g. between 10:1 to 1:2, e.g. 3:1 to 1:1. The ratios can be determined in a manner known in the art.

The final catalyst component, e.g. the ZN catalyst component, thus obtained may be combined with further catalyst component(s) conventionally used in the art, such as a cocatalyst (e.g. aluminium alkyl compounds) and/or an external donor compound selected from silanes and (internal) electron donors as defined below. Said further catalyst component(s) can be combined with the present catalyst component during the preparation method of the present catalyst component, or during the actual polymerisation step by adding the catalyst component of the invention and the further component(s) separately into a reactor.

The invention thus provides a controllable method to obtain active catalyst particles with i.a. the desirable loading of the active species and highly preferable morphology, e.g. a narrow particle size distribution and markedly reduced fines content in the polymer. The catalyst support and the final catalyst prepared thereof are also novel with improved properties and thus form part of the invention.

Depending on the chosen reaction conditions, the average size of the catalyst particles of the invention may vary between 1 to 500 µm, e.g. 5 to 500 µm, advantageously 5 to 200 µm or 10 to 150 µm. Even an average size between 5 to 50

μm, such as 10 to 20 μm is possible. The usable particle size depends on the polymerisation wherein the catalyst is used.

In a still further embodiment of the invention the catalyst component(s) can be prepolymerised before the actual polymerisation step.

Starting Compounds for the Support Material

The basic idea of the invention lies in the specific post treatment step of a reaction product formed from the Mg and the Group 13 or 14 compound, which brings the advantages of the invention. Thus the starting material for the catalyst support of the invention can be chosen from one or more magnesium compound(s), provided that at least one Mg compound contains hydrocarbyloxy, and from one or more halogen-containing compound(s) of an element of Group 13 or 14 of the Periodic Table, which are usable for forming a ZN catalyst and which can be brought in a solution and, when contacted together in suitable conditions, form a reaction product which solidifies in said reaction media. Such compounds, the solutions thereof, as well as the reaction conditions to obtain the solid reaction product thereof, are within the skills of a person working in the field of Ziegler-Natta chemistry.

Accordingly, the catalyst support of the invention comprises a reaction product formed at least from:

1) Compound (1): A magnesium hydrocarbyloxy compound of a general formula (I):

$$Mg(OR_1)_{2-n}(R_1)_n X_x \qquad (I),$$

wherein each $R_1$ is independently a $C_{1-20}$ hydrocarbyl group, e.g. a $C_{2-15}$ group, preferably a $C_{3-10}$ group, such as a $C_{4-10}$ group, suitably a $C_{4-10}$ group e.g. an alkyl, cycloalkyl, alkylcycloalkyl, cycloalkylalkyl, aryl, arylalkyl, or alkylaryl, wherein "alkyl" used as alone or as part of another option can be linear or branched and "aryl" is preferably of 5-12 carbon ring atoms, suitably phenyl or naphthyl; e.g. each $R_1$ is independently an ethyl, propyl, butyl, pentyl, hexyl, heptyl, octyl; each X is independently a halogen, preferably chlorine; $0 \leq n < 2$ and n may or may not be an integer; $0 \leq x < 2$ and may or may not be an integer; and the sum of (2−n), n and x is 2. In a preferred embodiment of the invention, a magnesium hydrocarbyloxy compound of formula $Mg(OR_1)_{2-n}(R_1)_n X_x$ (I), wherein each $R_1$ and X are independently as defined above; x is 0 and $0 \leq n < 2$, is used, which may be commercially available or, preferably, is a reaction mixture of a magnesium alkyl compound of formula $Mg(R_1)_2$ (III), wherein each $R_1$ independently is as defined above, with an alcohol $R_1OH$, wherein $R_1$ is as defined above; and 2) Compound (2): A halogen-containing compound of an element of Group 13 or 14 of Periodic Table (IUPAC), which is preferably a compound of Group 13, such as a halogen-containing aluminium or boron compound. Halogen is e.g. chlorine, bromine or iodine, preferably chlorine. In one preferred embodiment said compound is of formula (II):

$$Al(R_1)_x X_{3-x} \qquad (II),$$

wherein each $R_1$ is independently as defined above in formula (I), and particularly in case of formula (II) an alkyl of up to 6, such as up to 4, carbon atoms; and each X is independently a halogen, such as chlorine; $0 \leq x < 3$ and x may or may not be an integer; e.g. dialkyl aluminium chloride, such as dimethyl aluminium chlorides diethyl aluminium chloride, diisobutyl aluminium chloride, or alkyl aluminium dichloride, such as ethyl aluminium dichloride (EADC) or methyl aluminium dichloride;

The molar ratio of the element of compound (2) to Mg used may be between 0.5:1 and 2:1, preferably 0.8:1 to 1.2:1, such as 1:1.

Optionally, the present support material comprises further catalytically active compounds, e.g. those useful in a ZN catalyst, such as one or more (internal) electron donors, e.g. those known in the art for (co)polymerising propylene and higher olefins, including organic compounds containing oxygen, nitrogen, sulphur and/or phosphorus, such as organic acids, organic acid anhydrides, organic acid esters; alcohols, ethers, aldehydes, ketones, amines, amine oxides, amides, thiols, various phosphorus acid esters and amides, and the like, added as such or formed in situ, and such compound(s) may be added into one of the solutions of (1) and (2) before the combination of the solutions, or into the reaction media of compounds (1) and (2). Preferably, the support consists of the reaction product of compound (1), optionally prepared from compound (III) and $R_1OH$ as defined above, and of compound (2).

Alternatively, said at least one (internal) electron donor or further compound(s) can be added after the formation of the support product, e.g. when treating the obtained support with the transition metal compound.

Solutions of the Starting Compounds

The term "solution" is understood herein broadly to include solutions prepared from (a) one or more of the support forming compounds in liquid form (liquid at the room temperature or a melt prepared at a higher temperature), and/or (b) from an organic solvent(s).

The solutions are suitably formed using an organic solvent that dissolves the compounds. Preferred solvents include inert hydrocarbons, e.g. linear or branched aliphatic, alicyclic or aromatic $C_{5-20}$ hydrocarbons, preferably $C_{6-12}$ hydrocarbons, wherein the ring systems may contain hydrocarbon, e.g. $C_{1-6}$ alkyl substituents, such as cyclohexane, hexane, heptane, octane or toluene, or any mixtures thereof. E.g. linear or branched alkanes, e.g. hexane, heptane or octane, may be used.

Wash Solution

As the wash solution, e.g. any organic solvent or mixtures thereof known in the art can be used. Preferable solvents include hydrocarbons as defined above, e.g. pentane, hexane or heptane, particularly heptane.

The Catalyst Component for the Polymerisation of Olefins

The invention further provides a catalyst component, comprising the catalyst support of the invention treated with one or more further catalytically active compound(s), such as one or more transition metal compound(s), e.g. those conventionally used in the ZN catalysts, metallocenes, metallocene type complexes, chromium compounds etc., or any mixtures thereof, and/or a cocatalyst.

Preferably a Ziegler-Natta catalyst component is provided, wherein said support is treated at least with:

3) One transition metal compound of Group 4 to 10, preferably of Group 4 to 6, more preferably of Group 4, of the Periodic Table (IUPAC). The transition metal compound is suitably a Ti compound. Particularly, a tetravalent Ti compound can be used. Examples of such compounds are:

$$TiX_4 \qquad (IV),$$

wherein each X is independently defined as above in formula (I), such as Cl; and $$Ti(OR_1)_{4-p} X_p \qquad (V),$$

wherein each X and $R_1$ are as defined above in formula (I)
p is 0, 1, 2 or 3;

Preferably, titanium tetrachloride is used.

In the method of the invention for preparing a catalyst component, the solid catalyst support of the invention, preferably as prepared by the present method, is treated with a further catalytically active compound(s) as defined above. Preferably a Ziegler-Natta catalyst component is prepared by suspending the particulate support of the invention in an organic solvent as defined above and treating the support at least with one transition metal compound as defined above. The treatment step is preferably effected in a manner known in the field of ZN chemistry. The molar ratio of the transition metal to be added is preferably 2 to 0.3, e.g. 1.5 to 0.4, such as 1 to 0.5 to one mol Mg present in the support material.

In case of a ZN catalyst, the optional addition of an (internal) electron donor can be effected, as said above, during the formation of the support or, alternatively after the formation of the support product, e.g. together with the transition metal compound.

EMBODIMENTS

The solution of the magnesium hydrocarbyloxy compound is preferably a solution of a magnesium alkoxy compound which may be a commercially available magnesium alkoxy compound or be prepared from a magnesium alkyl compound and an alcohol. Accordingly, in a preferred embodiment for preparing the catalyst support and a supported polymerisation catalyst, suitably a ZN catalyst component, of the invention:

A solution (1) containing a magnesium hydrocarbyloxy compound of formula $Mg(OR_1)_{2-n}(R_1)_n X_x$ (I), wherein $R_1$ and X are as defined above; x is 0 and $0 \leq n < 2$, is prepared first:

by contacting, in a hydrocarbon solvent (e.g. heptane), a compound of formula $Mg(R_1)_2$ (III), wherein $R_1$ is as defined above under formula (I), e.g. each $R_1$ is independently methyl, ethyl, propyl, butyl, pentyl, hexyl, heptyl or octyl, e.g. di(n-butyl) magnesium, n-butyl sec-butyl magnesium, butyl ethyl magnesium or butyl octyl magnesium, preferably butyl octyl magnesium (BOMAG);

with an alcohol of formula $R_1OH$, wherein $R_1$ is as defined above under formula (I), suitably a cycloalkyl, cycloalkylalkyl, aryl, alkylaryl, arylalkyl or alkyl, each containing from 2 to 15, preferably from 3 to 10 carbon atoms. Preferably $R_1$ is a $C_{3-15}$ cycloalkyl or branched or unbranched $C_{3-15}$ alkyl, preferably a $C_{4-10}$ cycloalkyl or a branched or unbranched $C_{4-10}$ alkyl, such as cyclopentanol, 2-methyl-2-propanol, 2-ethyl-1-butanol, 2-methyl-1-pentanol, 2-ethyl-pentanol, 2-ethyl-1-hexanol, n-heptanol, n-octanol and decanol, preferably 2-ethyl-1-hexanol. The alcohols which are usable to transform the magnesium hydrocarbyl to a magnesium hydrocarbyloxy complex soluble in a hydrocarbon solvent, are known in the art or can be readily determined by a skilled person. Said contact is effected in a temperature between 0 and 100° C., preferably at 10-40° C., e.g. at 20-30° C. The reaction can be completed by heating the system at 50-100° C. for 10 to 100 min. Preferably the alcohol is added to the Mg solution. The molar ratio of Mg dihydrocarbyl to $R_1OH$ (Mg:$R_1OH$) is preferably from 1:1 to 1:4, more preferably 1:1 to 1:3.5, e.g. 1:1.5 to 1:3.5, especially 1:1.8 to 1:3.1.

The solution (2) of the halogen-containing compound is prepared by dissolving in a hydrocarbon solvent as defined above (e.g. toluene) a compound of formula

$$Al(R_1)_x X_{3-x} \quad \quad (II),$$

wherein each $R_1$ is independently as defined above, preferably an alkyl of up to 6, such as up to 4, carbon atoms; and each X is independently a halogen, such as chlorine; and x may of may not be an integer $0 \leq x < 3$; e.g. dimethyl aluminium chloride, diethyl aluminium chloride, diisobutyl aluminium chloride, ethyl aluminium dichloride and methyl aluminium dichloride, preferably ethyl aluminium dichloride (EADC). Such solutions may also be commercially available, whereby they may be further diluted, if desired, with a solvent as defined above.

The prepared reaction mixture (1), i.e. Mg-hydrocarbyloxy-containing solution (1), is then added slowly to the obtained Al solution (2).

The addition may be effected under stirring suitably at room temperature. After the addition the formed slurry may be heated to e.g. 20 to 100° C., such as 40 to 80° C., suitably 50 to 70° C., for a suitable period of time, such as from 5 minutes to 24 hours, e.g. 10 to 120 minutes, such as 30 to 60 minutes.

In case of EADC, the molar ratio of Al:Mg used may be of 0.5:1 to 2:1, preferably 0.7:1 to 1.5:1, or 0.8:1 to 1.2:1, such as 0.9:1 to 1.1:1, suitably 1:1. If another Al compound is used in place of EADC, then the Al compound is used in an amount that results in a halogen content which corresponds to the halogen content obtained with EADC at the above given ratios.

The formed reaction product is washed with heptane until a molar ratio of Al:Mg of $\geq 0.3$, e.g. of $\geq 0.4$ suitably of $\geq 0.6$, preferably $0.4 \leq Al:Mg \leq 1.1$, such as $0.6 \leq Al:Mg \leq 0.99$, or e.g. $0.7 \leq Al:Mg \leq 0.99$ is achieved. In one further embodiment also a ratio of $\geq 0.80$, e.g. $\geq 0.85$, such as $0.85 \leq Al:Mg \leq (0.99$ to 1, e.g 0.99) may be used. The washing step can be carried out in a temperature between 0-100° C., suitably 20-100° C., e.g. 40-80° C., such as 55-70° C.

The solid catalyst support obtained can then be used for the preparation of the catalyst component. Preferably, the support is slurried in a fresh hydrocarbon solvent as defined above (e.g. heptane) and to the slurry titanium tetrachloride is added slowly e.g. in a manner known in the art, at the temperature of 0-100° C., preferably at 10-50° C. The components are allowed to react with each other e.g. at 20-100° C., e.g. 50-80° C., for 10-120 minutes, such as 30-60 minutes. Titanium tetrachloride is added to the support material e.g. in a molar ratio of 2 to 0.3 mol Ti, preferably 1 to 0.5 mol Ti, to one mol of Mg in the support.

The supported catalyst particles may then be washed and dried in a conventional manner.

In a still further embodiment of the method of the invention, a solution of the halogen-containing compound of Group 13 or 14 of the Periodic Table (compound (2)), preferably an Al—Cl compound of formula (II) as defined above, is dispersed as droplets to an inert immiscible solvent to form an emulsion.

The solvent of the continuous phase is preferably a highly fluorinated hydrocarbon solvent (i.e. the majority of the —C—H units are replaced with —C—F units) or a perfluorinated hydrocarbon solvent (i.e. all —C—H units are replaced with —C—F units), which optionally contain functional groups (See the articles of A. Enders and G. Maas in "Chemie in unserer Zeit", 34. Jahrg. 2000, Nr.6, and of Pierandrea Lo Nostro in "Advances in Colloid and Interface Science, 56 (1995) 245-287, Elsevier Science). Said fluorinated solvent is preferably a perfluorinated hydrocarbon (e.g. perfluorinated alkane, such as perfluorohexane, perfluoroheptane, perfluorooctane, perfluorononane or perfluorodecane, peferably perfluorooctane).

To the obtained emulsion, a solution of the Mg compound (1), preferably a reaction mixture of $R_1OH$ and a magnesium dialkyl compound (III) as defined above, in an organic solvent, e.g. inert hydrocarbon as defined above, such as heptane, is added (preferably slowly) to cause the solidification of the reaction product.

The similar addition temperatures and subsequent heat treatment of the reaction slurry as described under "Embodiments" above may be used. After the formation of the solid reaction product, the solvents of the system, i.e. the solvent(s) used for the starting compounds together with the solvent of the continuous phase, are removed and the solid product is washed using a wash solvent and the wash temperature as described under "Embodiments" above.

Preferably, the washing is carried out with heptane at elevated temperature to achieve the support material of the invention. Preferably, the molar ratio of the element of compound (2) (e.g. Al):Mg of the support material is adjusted with the washing step to the level of the invention.

This embodiment provides a convenient alternative for moderate washing of the product to achieve said ratios in higher levels, e.g. between 0.6 and 0.99, such as 0.70 to 0.85, with, again, e.g. an excellent morphology of the obtained catalyst and the resulting polymer product.

Polymerisation Process

As mentioned above the catalyst particles of the invention can be used as such or together with a separate cocatalyst and/or an electron donor, as a Ziegler-Natta catalyst for the (co) polymerisation of an olefin in a manner known in the art. It is also possible to combine said catalyst with one or more other ZN and/or non-ZN catalysts.

The olefin to be polymerised using the catalyst system of the invention can be any olefin polymerisable in a coordination polymerisation including an alpha-olefin alone or a mixture of one or more comonomers. Preferable olefins are alpha-olefins, e.g. ethylene or propene, or a mixture of ethylene or propene with one or more alpha-olefin(s). Preferable comonomers are C2-C12 olefins, preferably C4-C10 olefins, such as 1-butene, isobutene, 1-pentene, 1-hexene, 4-methyl-1-pentene, 1-heptene, 1-octene, 1-nonene, 1-decene, as well as diene, such as butadiene, 1,7-octadiene and 1,4-hexadiene, or cyclic olefins, such as norbornene, and any mixtures thereof.

The present catalyst is particularly preferred for the polymerisation of polyethylene and any copolymers thereof. It may also suitably be used to produce e.g. polypropylene homopolymers and any copolymers thereof.

Polymerisation may be effected in one or more, e.g. one, two or three polymerisation reactors, using conventional polymerisation techniques, in particular gas phase, solution phase, slurry or bulk polymerisation. Polymerisation can be a batch or continuous polymerisation process. Generally a combination of slurry (or bulk) and at least one gas phase reactor is preferred, particularly with gas phase operation coming last.

For slurry reactors, the reaction temperature will generally be in the range of 40 to 110° C. (e.g. 60-110° C.), the reactor pressure will generally be in the range 5 to 80 bar (e.g. 50-60 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may, if desired, be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours.

Generally the quantity of catalyst used will depend upon the nature of the catalyst, the reactor types and conditions and the properties desired for the polymer product. Conventional catalyst quantities, such as described in the publications referred herein, may be used.

With the method of the invention a catalyst system with a high bulk density and a good morphology is obtained and the catalyst exhibits a high catalytic activity. According to the so-called "replica effect" the bulk density and the morphology correlates with product bulk density and product morphology. Thus the catalyst leads to a polymer which also has advantageous properties, e.g. low fines level.

EXAMPLES

The following examples are provided by way of illustration of the invention. All the used starting materials and solvents are commercially available or can be prepared according or analogously to methods described in the literature, e.g.: $(C_4H_9)_{1.5}Mg(C_8H_{17})_{0.5}$ in 20 wt-% heptane solution: supplied by Crompton, Germany (BOMAG); $EtAlCl_2$ in 18.5 wt-% toluene solution: Crompton, Germany (EADC); triethylaluminium in 20 wt-% heptane solution (TEA-20): Crompton, Germany; $TiCl_4$: Aldrich, Germany; octadecafluorooctane (PFO): P&M Scientific Industrial Association, Russia.

The particle size distribution was analysed by Coulter in a manner known in the art.

Examples 1 to 3

The effect of the wash to the molar ratio of the support is shown with examples 1 to 3.

The wash efficiency was changed in the carrier preparation by changing the mixing speed in the wash, and by changing the number of wash cycles of the carrier material. First, the mixing speed was decreased in the heptane wash of the precipitated carrier material from 200 rpm to 100 rpm to decrease the wash efficiency (example 2). Secondly, the number of heptane washes of the support material was decreased from two to one (example 3), also in order to decrease the wash efficiency. The changes are listed in Table 1.

TABLE 1

The changes in the carrier preparation recipe in Examples 1-3

| | Examples | | |
|---|---|---|---|
| | 1 | 2 | 3 |
| Mixing speed in $C_7$ wash (rpm) | 200 | 100 | 200 |
| Number of heptane washes | 2 | 2 | 1 |

Preparation of the Catalysts:

The carrier and the catalyst synthesis were done in a 20 l reactor. Strictly inert conditions were used in all the experiments.

Addition of PFO:

6.9 l (12.2 kg, 27.8 mol) of PFO was added to the 20 l reactor in inert condition. The reactor and the PFO were earlier purged with nitrogen. Mixing was adjusted to 400 rpm and temperature 20° C.

Preparation of a EADC Emulsion in PFO:

1.75 l (1.565 kg, 2.28 mol of Al) of EADC was then added to the reactor. If the PFO is pure from oxygen and moisture, there is no colour change in the EADC droplets. The EADC solution forms an emulsion in PFO at 20° C. To ensure full emulsification the mixture was mixed 400 rpm at 20° C. for 30 min.

Precipitation of MgCl$_2$ Carrier:

3.31 l (2.44 kg, 2.24 mol of Mg) of a heptane solution of Mg(—O—CH$_2$—HC(C$_2$H$_5$)—C$_4$H$_9$)$_2$ (2.23% Mg) was prepared by mixing BOMAG with heptane in the molar ratio of Mg:heptane of 1:6.65, adding 2-ethyl-hexanol slowly, at room temperature, in the molar ratio of Mg:ROH of 1:2, whereafter increasing the temperature of the mixture to 45° C. and mixing at this temperature for 30 min. The obtained solution was added during 45 min to the emulsion in the 20 l reactor. Already during the addition stage, the dispersion is changed from an emulsion to a suspension. After addition the temperature was increased to 70° C. Mixing rate was 400 rpm. When the temperature of 70° C. was reached, the solution could optionally be held at this temperature for 30 min. Here after the reaction mixture was allowed to separate. Due to the high density of the PFO, the catalyst carrier floats on the surface of this solution. The PFO-hydrocarbon solution was separated from the carrier material by siphoning.

Hydrocarbon Wash of the Carrier:

9 l (6.6 kg, 66 mol) of heptane was added to the reactor. Mixing rate was 100 or 200 rpm and temperature 60° C. The washing was continued for 20 min after which the carrier was allowed to settle for 20-30 min, depending on the experimental set up. The wash solution was drawn off by siphoning. Depending on the experiments this washing step was done just once or repeated twice, see above.

Preparation of the Catalyst by Addition of TiCl$_4$:

7 l (5 kg, 30 mol) of heptane was added to the obtained support material to create a new slurry. Mixing rate was 200 rpm. Then 123 ml (212.2 g, 1.118 mol) of TiCl$_4$ was added to the reactor. The suspension was heated to 70° C. and the reactants were allowed to react with each other for 45 min. After this the catalyst was allowed to settle for 20 min and the supernatant was then siphoned off. After this the catalyst was washed twice with heptane. The washing procedures were the same as used when washing the carrier.

Take Out of the Catalyst:

2 l (1.37 kg, 13.7 mol) of heptane was added to the reactor to create a new suspension. This suspension was shifted over to a receiving vessel.

Determination of Ti, Mg and Al:

Samples were taken from the washed support material and from the catalyst.

The Al and Mg containing carrier samples and the Ti and Al containing catalyst samples were dissolved in a mixture of nitric and hydrofluoric acid and the metals were measured by flame atomic absorption with a nitrous oxide/acetylene flame. The results for the carrier material are listed in Table 2 and the results for the catalyst material are listed in Table 3.

Determination of Ti$^{4+}$ and Ti$^{3+}$:

For the determination of Ti$^{3+}$ the sample is dissolved in hydrochloric acid and Ti$^{3+}$ is determined titrimetrically with a standard ferric sulphate solution with potassium tiocyanate as indicator (titration A):

Ti$^{3+}$+Fe$^{3+}$=Ti$^{4+}$+Fe$^{2+}$

Fe$^{3+}$+SCN$^-$=Fe(SCN)$^{2+}$ (red colour)

For the determination of Ti$^{4+}$ (titration B) a second sample is dissolved in hydrochloric acid and Ti$^{4+}$ is reduced to Ti$^{3+}$ by running the solution trough a zinc amalgam reductor. Ti$^{3+}$ is determined titrometrically as in titration A. In this titration the sum of Ti$^{3+}$ and Ti$^{4+}$ in the sample is determined. Ti$^{4+}$ is obtained by subtracting the result from titration A from that of titration B:

2Ti$^{4+}$+Zn—Hg=2Ti$^{3+}$+Zn$^{2+}$—Hg

Ti$^{3+}$+Fe$^{3+}$=Ti$^{4+}$+Fe$^{2+}$

Fe$^{3+}$+SCN$^-$=Fe(SCN)$^{2+}$ (red colour)

The results are listed in Table 3.

PSD of Carrier:

The particle size distribution of the carrier samples were done by known coulter measurements. From the coulter PSD curves the mode, i.e. the PS of the maximum fraction was measured. The results are listed in Table 2.

Test Polymerisation:

A 3 l autoclave reactor was used. 1800 ml (1.127 kg, 15.6 mol) of pentane was introduced into the reactor as reaction medium. After adding the polymerisation medium the temperature of the reactor was adjusted to 90° C. The co-catalyst and the catalyst were fed into the reactor by means of two feed vessels. TEA was used as co-catalyst. An Al/Ti molar ratio of 70-90 was used in the homo-polymerisations (about 0.5 ml TEA).

After introduction of the co-catalyst into the reactor, about 5-10 mg of the studied catalyst was fed together with 10 ml (6.3 g, 87 mmol) of pentane. An additional 500 ml feed vessel was connected to provide 17.5 bar of H$_2$ pressure (385 mmol). This amount corresponded to the so-called high MFR test polymerisation condition (see above). The polymerisation was started by introducing both the H$_2$ together with the ethene monomer to the reactor. A total pressure of 14.4 bar was maintained by the ethene feed trough out the polymerisation. The polymerisation was carried out for 1 h at 90° C. The polymerisation was stopped by venting off the monomer and the pentane.

Characterisation of the Polymers:

The polymers were characterised in respect of their particle size distribution. APS=average particle size. The results are listed in Table 4.

TABLE 2

Results of the support material

| | Example | | |
|---|---|---|---|
| | 1 | 2 | 3 |
| Al/Mg molar ratio (mol/mol) | 0.15 | 0.77 | 0.95 |
| APS (μm) | 13.6 | 16.4 | 18.0 |

TABLE 3

Results of the catalyst material

| | Example | | |
|---|---|---|---|
| | 1 | 2 | 3 |
| Al/Ti molar ratio [mol/mol] | 0.52 | 0.41 | 0.17 |
| % as Ti$^{2+}$ | 21 | 22 | 34 |
| % as Ti$^{3+}$ | 14 | 25 | 14 |
| % as Ti$^{4+}$ | 65 | 53 | 52 |

TABLE 4

Results of the polymer material

| | Example | | |
|---|---|---|---|
| | 1 | 2 | 3 |
| Activity, [kg PE/(g Ti h)] | 239 | 319 | 165*) |
| APS [mm] | 0.22 | 0.31 | 0.38 |
| Fines [%], d < 100 μm | 13.8 | 11.1 | 4.4 |

*)Lower activity shows that increased PS and less fines are not activity related Example 4

The catalyst support and the final catalyst of the invention were prepared without the emulsion formation, i.e. using the starting material and conditions as described above in examples 1-3 of the invention, with the exception that no PFO was used and the wash hydrocarbon was changed from heptane to pentane. The polymerisation test was effected as described under "Test polymerisation" below. Activity was 241 kg PE/(g Ti h). Particle size of the carrier was 18.1 μm and particle size of the produced polymer was 0.45 mm showing 3.7% of fines.

Comparative Example (As the Closest Prior With No Recovery Step of the Support)

To show that a washing step is necessary after precipitation of the carrier material a comparative example was done on laboratory scale (5.1 mmol of Mg and Al). In this experiment the washing of the precipitated carrier material was left out, i.e. the titanation of the support material was carried out in the same solution as where the precipitation of the support had taken place. Otherwise the same conditions were used as in Example 4. The resulting polymer showed 6.2% of very fine material and, in addition to that, >50% of fines material which was agglomerated to aggregates. About 15% of the material had an irregular shape and had a diameter bigger than 2 mm.

The examples show the benefits of the loading of the carrier material of the invention and the effect of the washing step/no washing step on the content of the support material. It also appears that the mechanical strength of the carrier material of the invention is very good.

The invention claimed is:

1. A process for producing a particulate support for an olefin polymerization catalyst having an average particle size distribution between 1 to 500 μm, the process comprising, adding a solution of a magnesium compound of a formula (I):

$$Mg(OR_2)_{2-n-x}(R_1)_n X_x \qquad (I):$$

wherein each $R_1$ and $R_2$ independently represent a $C_{3-10}$ hydrocarbyl group; X is a halogen; $0 \leq n < 2$ and may or may not be an integer; $x < 2$ and may or may not be an integer; the sum of (2- n), n, and x is 2 to a solution of a halogen-containing aluminum compound selected from the group consisting of dimethyl aluminium chloride, diethyl aluminium chloride, methyl aluminium dichloride and ethyl aluminium dichloride, to obtain a solid reaction product in a liquid reaction medium;

recovering the solid reaction product by separating the solid reaction product from the liquid reaction medium; and washing the solid reaction product with a wash solution until the molar ratio of aluminum to magnesium has a value of at least 0.3.

2. The process according to claim 1, wherein the molar ratio of aluminum to magnesium has a value of $0.4 \leq$ aluminum:magnesium $\leq 1.1$.

3. The process according to claim 1, wherein the wash solution is an inert linear or branched aliphatic, alicyclic or aromatic $C_{5-20}$ hydrocarbon or any mixtures thereof.

4. The process according to claim 1, wherein the magnesium compound is of formula (I):

$$Mg(OR_2)_{2-n}(R_1)_n \qquad (I),$$

wherein each $R_1$ and $R_2$ independently represents a $C_{3-10}$ hydrocarbyl group; and $0 \leq n < 2$ and may or may not be an integer.

5. The process according to claim 1, wherein the solution of the magnesium compound (I) is a reaction mixture prepared by contacting in an inert hydrocarbon solvent or any mixtures thereof (a) a magnesium alkyl of formula $Mg(R_1)_2$ (III), wherein each $R_1$ independently represents a $C_{3-10}$ hydrocarbyl group, with (b) an alcohol of formula $R_2OH$, wherein $R_2$ represents a $C_{3-10}$ hydrocarbyl group.

6. The process according to claim 5, wherein the magnesium alkyl compound (III) is butyloctylmagnesium.

7. The process according to claim 5, wherein the alcohol $R_2OH$ is 2-ethyl-1-hexanol.

8. The process according to claim 6, wherein butyloctylmagnesium in an inert hydrocarbon solvent or any mixtures thereof is contacted with 2-ethyl-1-hexanol and the obtained solution is added to a solution of ethyl aluminum dichloride in an inert hydrocarbon solvent or any mixtures thereof to form a solid reaction product.

9. A solid catalyst support for an olefin polymerization catalyst obtained by the method of claim 1.

10. A solid catalyst support for an olefin polymerization catalyst comprising a separated and/or washed solid reaction product of (a) a magnesium compound of formula (I) and (b) a halogen-containing aluminium compound selected from the group consisting of dimethyl aluminium chloride, diethyl aluminium chloride, methyl aluminium dichloride and ethyl aluminium dichloride, wherein the molar ratio of aluminum to magnesium in said support is $\geq 0.3$.

11. A solid catalyst support according to claim 10, which comprises a separated arid/or washed solid reaction product of (a) a reaction mixture of a solution of magnesium alkyl of formula $Mg(R_1)_2$ (III), wherein each $R_1$ independently represents a $C_{3-10}$ hydrocarbyl group, with an alcohol of formula $R_2OH$, wherein $R_2$ represents a $C_{3-10}$ hydrocarbyl group, in an inert hydrocarbon solvent or any mixtures thereof; and (b) a solution of a halogen-containing aluminium compound selected from the group consisting of dimethyl aluminium chloride, diethyl aluminium chloride, methyl aluminium dichloride and ethyl aluminium dichloride in an inert hydrocarbon solvent or any mixtures thereof.

12. The solid catalyst support according to claim 11, wherein the molar ratio of Al:Mg in said support is $\geq 0.4$.

13. The solid support according to claim 11, wherein in the alcohol of formula $R_2OH$, $R_2$ is a $C_{3-10}$ cycloalkyl or branched or unbranched $C_{3-10}$ alkyl.

14. A process for producing a Ziegler-Natta catalyst component for olefin polymerization comprising treating, in an inert solvent, the solid catalyst support according to claim 9, with a transition metal compound of Group 4 to 6 of the Periodic Table (IUPAC).

15. The process according to claim 14, wherein the transition metal compound is a tetravalent titanium compound.

16. The process according to claim 15, wherein the transition metal compound is titanium tetrachloride ($TiCl_4$)

17. The process according to claim 16, wherein $TiCl_4$ is used in a molar ratio of 1-0.5 one mol of Mg present in the support.

18. A process for (co)polymerizing an olefin, wherein the catalyst component produced according to claim 14 is contacted with the olefin.

19. The process of claim 1, wherein the molar ratio of aluminum to magnesium in the obtained reaction product material has a value of at least 0.4.

20. The process of claim 2, wherein the molar ratio of aluminum to magnesium in the obtained reaction product material has a value of $0.6 \leq$ aluminum:magnesium $\leq 0.99$.

21. The process of claim 19, wherein the wash solution is an inert linear or branched aliphatic, alicyclic or aromatic $C_{5-20}$ hydrocarbon or any mixtures thereof.

22. The process of claim 3, wherein the washing step is carried out at a temperature between 40 to 80.°C.

23. The process of claim 21, wherein the washing step is carried out at a temperature between 40 to 80.°C.

24. The process of claim 4 wherein the solution of the magnesium hydrocarbyloxy compound (I) is a reaction mixture prepared by contacting in an inert hydrocarbon solvent or any mixtures thereof (a) a magnesium alkyl of formula $Mg(R_1)_2$(III), wherein each $R_1$ independently represents a $C_{3-10}$ hydrocarbyl group, with (b) an alcohol of formula $R_2OH$, wherein $R_2$ represents a $C_{3-10}$ hydrocarbyl group.

25. The process of claim 24 wherein the magnesium alkyl compound (III) is butyloctylmagnesium.

26. The process of claim 6, wherein the alcohol $R_2OH$ is 2-ethyl-1-hexanol.

27. The process of claim 24, wherein the alcohol $R_2OH$ is 2-ethyl-l-hexanol.

28. The process of claim 25, wherein the alcohol $R_2QH$ is 2-ethyl-1-hexanol.

29. The process according to claim 25, wherein butyloctylmagnesium in an inert hydrocarbon solvent or any mixtures thereof is contacted with 2-ethyl-1-hexanol and the obtained solution is added to a solution of ethyl aluminum dichloride in an inert hydrocarbon solvent or any mixtures thereof to form a solid reaction product.

30. The process of claim 5, wherein $R_1$ is a $C_{3-10}$ cycloalkyl or a branched or unbranched $C_{3-10}$ alkyl.

31. The process of claim 24, wherein $R_1$ is a $C_{3-10}$ cycloalkyl or a branched or unbranched $C_{3-10}$ alkyl.

32. A solid catalyst support for an olefin polymerization catalyst obtained by the method of claim 19.

33. The solid catalyst support of claim 10, wherein the molar ratio of aluminum to magnesium in said support is $\geq 0.4$.

34. The solid catalyst support of claim 10, wherein the separated and/or washed solid reaction product further comprises an electron donor.

35. The solid catalyst support of claim 33, wherein the separated and/or washed solid reaction product further comprises an electron donor.

36. A solid catalyst support according to claim 33, which comprises a separated and/or washed solid reaction product of (a) a reaction mixture of a solution of magnesium alkyl of formula $Mg(R_1)_2$ (III), wherein each $R_1$ independently represents a $C_{3-10}$ hydrocarbyl group, with an alcohol of formula $R_2OH$, wherein $R_2$ represents a $C_{3-10}$ hydrocarbyl group, in an inert hydrocarbon solvent or any mixtures thereof; and (b) a solution of a halogen-containing aluminum compound selected from the group consisting of dimethyl aluminum chloride, diethyl aluminum chloride, methyl aluminum dichloride and ethyl aluminum dichloride in an inert hydrocarbon solvent or any mixtures thereof.

37. A solid catalyst support of claim 11, wherein the molar ratio of Al:Mg in said support is $0.6 \leq Al:Mg \leq 0.99$.

38. A solid catalyst support of claim 36, wherein the molar ratio of Al:Mg in said support is 0.6 Al:T4g 0.99.

39. The solid support according to claim 12, wherein in the alcohol of formula R2OH, where R2 is a $C_{3-10}$ cycloalkyl or branched or unbranched $C_{3-10}$ alkyl.

40. The solid support according to claim 37, wherein in the alcohol of formula $R_2OH$, where $R_2$ is a $C_{3-10}$ cycloalkyl or branched or unbranched $C_{3-10}$ alkyl.

41. The solid support according to claim 36, wherein in the alcohol of formula $R_2OH$, where $R_2$ is a $C_{3-10}$ cycloalkyl or branched or unbranched $C_{3-10}$ alkyl.

42. The process of claim 14, further comprising treating the solid catalyst support with an electron donor.

43. The process of claim 42, further comprising recovering the catalyst component.

44. The process according to claim 42, wherein the transition metal compound is a tetravalent titanium compound.

45. The process according to claim 43, wherein the transition metal compound is a tetravalent titanium compound.

46. A process for (co)polymerizing an olefin, wherein the catalyst component produced according to claim 42 is contacted with the olefin.

47. A process for (co)polymerizing an olefin, wherein the catalyst component produced according to claim 43 is contacted with the olefin.

* * * * *

UNITED STATES PATENT AND TRADEMARK OFFICE
CERTIFICATE OF CORRECTION

PATENT NO. : 7,432,220 B2
APPLICATION NO. : 10/536523
DATED : October 7, 2008
INVENTOR(S) : Thomas Garoff, Päivi Waldvogel and Kari Pesonen It is certified that error appears in the above-identified patent and that said Letters Patent is hereby corrected as shown below:

Column 5, line 29: in formula (I), delete "$Mg(OR_2)_{2-n}(R_1)_nX_x$" and add -- $Mg(OR_2)_{2-n-x}(R_1)_nX_x$ --.

Column 5, line 41: delete "the sum of (2-n), n, and x is 2" and add -- the sum of (2-n-x), n, and x is 2 --.

Column 7, line 32: in formula 1, delete "$Mg(OR_2)_{2-n}(R_1)_nX_x$" and add -- $Mg(OR_2)_{2-n-x}(R_1)_nX_x$ --.

Column 13, Line 58, Claim 1: in formula (I), delete "$Mg(OR_2)_{2-n-x(R1)}{}_nX_x$" and add -- $Mg(OR_2)_{2-n-x}(R_1)_nX_x$ --.

Column 13, Line 62, Claim 1: delete "the sum of (2-n), n, and x is 2" and add -- the sum of (2-n-x), n, and x is 2 --.

Column 14, Line 16, Claim 4: please delete "$Mg(OR_2)_{2-n}(R_1)_n$" and add -- $Mg(OR_2)_{2-n-x}(R_1)_n$ --.

Column 15, Line 9, Claim 17: delete "1-0.5 one mol" and add -- 1-0.5 mol to one mol --.

Column 16, Line 27, Claim 38: delete "0.6 Al:T4g 0.99" and add -- $0.6 \leq Al:Mg \leq 0.99$ --.

Column 16, Line 29, Claim 39: delete "R2OH" and add -- $R_2OH$ --.

Column 16, Line 29, Claim 39: delete "R2" and add -- $R_2$ --.

Signed and Sealed this

Twenty-fourth Day of February, 2009

JOHN DOLL
*Acting Director of the United States Patent and Trademark Office*